(12) United States Patent
Nakamura et al.

(10) Patent No.: US 11,190,819 B2
(45) Date of Patent: Nov. 30, 2021

(54) VIDEO TRANSMISSION SYSTEM

(71) Applicant: Media Links Co., Ltd., Kawasaki (JP)

(72) Inventors: Kazunori Nakamura, Kawasaki (JP); Kazuki Narita, Kawasaki (JP)

(73) Assignee: Media Links Co., Ltd., Kawasaki (JP)

(*) Notice: Subject to any disclaimer, the term of this patent is extended or adjusted under 35 U.S.C. 154(b) by 0 days.

(21) Appl. No.: 16/645,909

(22) PCT Filed: Sep. 14, 2017

(86) PCT No.: PCT/JP2017/033319
§ 371 (c)(1),
(2) Date: Mar. 10, 2020

(87) PCT Pub. No.: WO2019/053857
PCT Pub. Date: Mar. 21, 2019

(65) Prior Publication Data
US 2020/0280750 A1    Sep. 3, 2020

(51) Int. Cl.
*H04N 21/242* (2011.01)
*H04L 1/22* (2006.01)
(Continued)

(52) U.S. Cl.
CPC ......... *H04N 21/242* (2013.01); *H04L 1/22* (2013.01); *H04L 69/40* (2013.01);
(Continued)

(58) Field of Classification Search
CPC ......... H04N 21/242; H04N 21/4425; H04N 21/4305; H04N 21/64322; H04N 21/8547;
(Continued)

(56) References Cited

U.S. PATENT DOCUMENTS

| 2013/0003757 A1* | 1/2013 | Boatright ............ H04N 21/242 370/474 |
| 2017/0070772 A1* | 3/2017 | Nakamura ......... H04N 21/4425 |
| 2017/0264665 A1* | 9/2017 | Stevens .................. H04L 65/80 |

FOREIGN PATENT DOCUMENTS

| JP | 2003174632 A | 6/2003 |
| JP | 2010109978 A | 5/2010 |

(Continued)

OTHER PUBLICATIONS

SMPTE 2022-7 "Seamless Protection Switching" for DekTec network adapters, DekTec., Dec. 19, 2014, pp. 1-6.

*Primary Examiner* — Vinncelas Louis
(74) *Attorney, Agent, or Firm* — The Webb Law Firm

(57) ABSTRACT

Redundant transmitters send the same sequence numbers without matching the sequence numbers. The transmission system includes a PTP grand master, a first and second transmitters configured to synchronize a time with the PTP grand master according to PTP and receive video signals distributed from one video signal, and a receiver connected to the first and second transmitters over an IP-network, the first transmitter and the second transmitter respectively divide the video signals into a plurality of IP-packets, calculate an initial value for RTP sequence numbers based on PTP timestamps in accordance with the synchronized time according to PTP, set the RTP sequence numbers sequential from the initial value to a RTP sequence fields in the plurality of IP-packets respectively, and send the IP-packets to the receiver via a first and second transmission paths according to RTP.

6 Claims, 7 Drawing Sheets

(51) Int. Cl.
    *H04L 29/14*         (2006.01)
    *H04N 21/43*         (2011.01)
    *H04N 21/643*       (2011.01)
    *H04N 21/8547*     (2011.01)

(52) U.S. Cl.
    CPC ... *H04N 21/4305* (2013.01); *H04N 21/64322* (2013.01); *H04N 21/8547* (2013.01)

(58) Field of Classification Search
    CPC .. H04N 21/2402; H04N 21/631; H04L 65/80; H04L 1/22; H04L 69/40; H04L 65/602; H04L 65/604; H04L 69/329; H04L 69/16; H04L 65/608; H04L 1/08; H04J 3/0667
    See application file for complete search history.

(56) References Cited

FOREIGN PATENT DOCUMENTS

| | | |
|---|---|---|
| JP | 201755273 A | 3/2017 |
| WO | 2014181381 A1 | 11/2014 |

\* cited by examiner

VIDEO TRANSMISSION SYSTEM

CROSS-REFERENCE TO RELATE APPLICATION

This application is the United States national phase of International Application No. PCT/JP2017/033319 filed Sep. 14, 2017, the disclosure of which is hereby incorporated by reference in its entirety.

TECHNICAL FIELD

This disclosure relates to a video transmission system, and more specifically, to a video transmission system for setting the same RTP sequence numbers to the IP-packets including the same payloads among the redundant transmitters.

BACKGROUND ART

It is well-known that there is a broadcast system for transmitting video signals for sport broadcast from a stadium to a broadcast relay center directly to a broadcast station. Alternatively, it is well-known that there is a video transmitting system for transmitting video signals by multicast from a (main) broadcast station to other broadcast station. In the case of transmitting these video signals, the video signals are often converted to IP-packets and transmitted over an IP-network according to RTP (Real-time Transport Protocol). RTP refers to a protocol for delivering data signals such as audio and motion video in real time.

If a transmission path fails used for transmitting the above video signals, the IP-packets may not be transmitted. In order to address this situation, it is well-known to make the transmission path redundant. Making the transmission path redundant allows for, in the case of failure of an active transmission path, transmitting the IP-packets by switching the IP-packets from the active transmission path to a backup transmission path, thereby avoiding the interruption of transmitting the IP-packets. When the video signals are switched without any control, the corruption of videos are visible to a viewer. Therefore, in switching the IP-packets, it is necessary to switch the IP-packets seamlessly.

SMPTE (Society of Motion Picture and Television Engineers) 2022-7 Standard specifies the transmission scheme for switching the IP-packets and transmitting the video signals. SMPTE2022-7 specifies that a transmission side (transmitter) transmits a plurality of IP-packets including the same payload data to a destination via a plurality of different transmission paths (Ethernet). FIG. 1 shows the packet transmission scheme according to SMPTE2022-7.

As shown in FIG. 1, a transmitter 1 and a receiver 2 are connected via a transmission path 4 (active) and a transmission path 5 (backup) over an IP-network 3. The transmitter 1 receives input video signals (SDI signals, DVB-ASI signals or video and audio information contained in a payload in IP-packets received over Ethernet) transmitted from a broadcast station, encapsulate the input video signals into series of IP-packets (hereinafter referred to as "IP-packet stream"), duplicates the IP-packet (two IP-packet streams including the same payload data are generated by the duplication), and transmits the two IP-packet streams via the transmission paths 4 and 5, respectively. The same RTP sequence numbers are set to the duplicated two IP-packet streams. Since the IP-packets are transmitted via the transmission paths 4 and 5, respectively, different IP-headers, different MAC-headers, or different VLAN-tags, or all of them are set to the IP-packets, respectively. The receiver 2 receives the two IP-packet streams transmitted via the transmission paths 4 and 5, respectively, and normally reconstructs the video signals based on the IP-packet stream transmitted via the transmission path 4.

If the transmission path 4 fails, it is necessary to switch the IP-packets from the transmission path 4 to the transmission path 5. The receiver 2 controls such that the delays in receiving the IP-packet stream via the transmission paths 4 and 5 match at a switching point by buffering the IP-packet streams in buffer memories 2a and 2b for controlling the delay times (delay buffer). Thereby, it is possible to switch the IP-packet stream without corrupting the videos.

FIG. 1 shows that the transmission path 4 fails when the receiver 2 receives the IP-packet including the RTP sequence number "2". In this case, the receiver 2 cannot receive the IP-packets including the RTP sequence number "3" or "4" via the transmission path 4. On the other hand, the receiver 2 receives the IP-packets including the RTP sequence numbers "3" and "4" subsequent to receiving the IP-packet including the RTP sequence number "2" via the transmission path 5. When the receiver 2 reconstructs one IP-packet stream from the two IP-packet streams received via the transmission paths 4 and 5, the receiver 2 detects that the IP-packet including the RTP sequence number "3" is not in the delay buffer in the transmission path 4, and switches to the transmission path 5. Thereby, it can avoid the packet loss and the corruption of the reconstructed video signals by reconstructing the IP-packet stream from the IP-packets including the RTP sequence numbers "3" and "4" in the delay buffer in the transmission path 5. It can achieve the seamless video signal switching.

CITATION LIST

Non-Patent Literature

Application note DT-AN-IP-3, SMPTE 2022-7 "Seamless Protection Switching" for DekTec network adapter

SUMMARY OF INVENTION

In the above-mentioned scheme, if the transmitter fails, it may not be possible to transmit the IP-packet streams via any of the two transmission paths. Accordingly, when it requires higher reliability, it is necessary to make the transmitter redundant (e.g. using a plurality of devices and/or cards). In the scheme specified in SMPTE2022-7, since the video signals are reconstructed using the RTP sequence numbers, it is necessary to match the RTP sequence numbers among the plurality of redundant transmitters. However, there is no technique for matching the RTP sequence numbers among the plurality of transmitters. It is not possible to make the transmitter redundant in the scheme of reconstructing the video signals based on the RTP sequence numbers.

It is considered that an example scheme of matching the RTP sequence numbers among the redundant transmitters includes exchanging the RTP sequence numbers among a plurality of transmitters for example. However, such scheme takes considerable time to exchange the RTP sequence numbers in transmitting uncompressed video data at high speed according to SMPTE2022-6, and increasing the overhead for the processes according to the protocol, and thus cannot be practical in existing technologies.

The embodiment provides a video transmission system for setting the same RTP sequence numbers to the IP-packets including the same payloads among the redundant transmitters and transmitting the IP-packets over the IP-network without exchanging the RTP sequence numbers among the plurality of transmitters.

The video transmission system according to one embodiment includes a PTP grand master, a first transmitter configured to synchronize a time with the PTP grand master according to PTP, a second transmitter configured to synchronize a time with the PTP grand master according to PTP, and a receiver connected to the first transmitter and the second transmitter over an IP-network, wherein the first transmitter and the second transmitter respectively, receive video signals distributed from one video signal, divide the video signals into a plurality of IP-packets, calculate an initial value for RTP sequence numbers based on PTP timestamps in accordance with the synchronized time according to PTP, and set the RTP sequence numbers sequential from the initial value to a RTP sequence fields in the plurality of IP-packets respectively, the first transmitter sends to the receiver, the plurality of IP-packets set the RTP sequence numbers as first IP-packets via a first transmission path according to RTP, and the second transmitter sends to the receiver, the plurality of IP-packets set the RTP sequence numbers as second IP-packets via a second transmission path according to RTP.

The video transmission system according to another embodiment includes a first transmitter configured to receive video signals distributed from one video signal, divide the video signals into a plurality of first IP-packets, and send the plurality of first IP-packets via a first transmission path, a second transmitter configured to receive the distributed video signals, divide the video signals into a plurality of second IP-packets, and send the plurality of second IP-packets via a second transmission path, and a receiver connected to the first transmitter and the second transmitter over an IP-network, wherein the first transmitter, sets the sequence numbers as first RTP sequence numbers to RTP sequence fields in the plurality of first IP-packets respectively, send to the receiver, the plurality of first IP-packets set the first RTP sequence numbers via a first transmission path according to RTP, and issues an initialization instruction to the second transmitter at a predetermined timing, wherein the second transmitter, sets the sequence numbers as second RTP sequence numbers to RTP sequence fields in the plurality of second IP-packets respectively, send to the receiver, the plurality of second IP-packets set the second RTP sequence numbers via a second transmission path according to RTP, receive the issued initialization instruction, and in response to receiving the initialization instruction, initializes the second RTP sequence numbers.

According to the video transmission system of the embodiment, each of the plurality of redundant transmitters can independently set the RTP sequence numbers to the IP-packets and transmit the IP-packets according to RTP without exchanging the RTP sequence numbers among the plurality of redundant transmitters.

DETAILED DESCRIPTION OF INVENTION

First Embodiment

IEEE1588v2 specifies a time delivering method with high accuracy over a LAN (Local Area Network). A network according to PTP includes a PTP grand master and a PTP slave. The PTP grand master is generally implemented as hardware for using for example GPS signals with high accuracy, atomic clock signals, or BB (Black Burst) signals for synchronizing video signals as a reference clock source. The PTP slave synchronizes a time with the PTP grand master.

Figure 1:
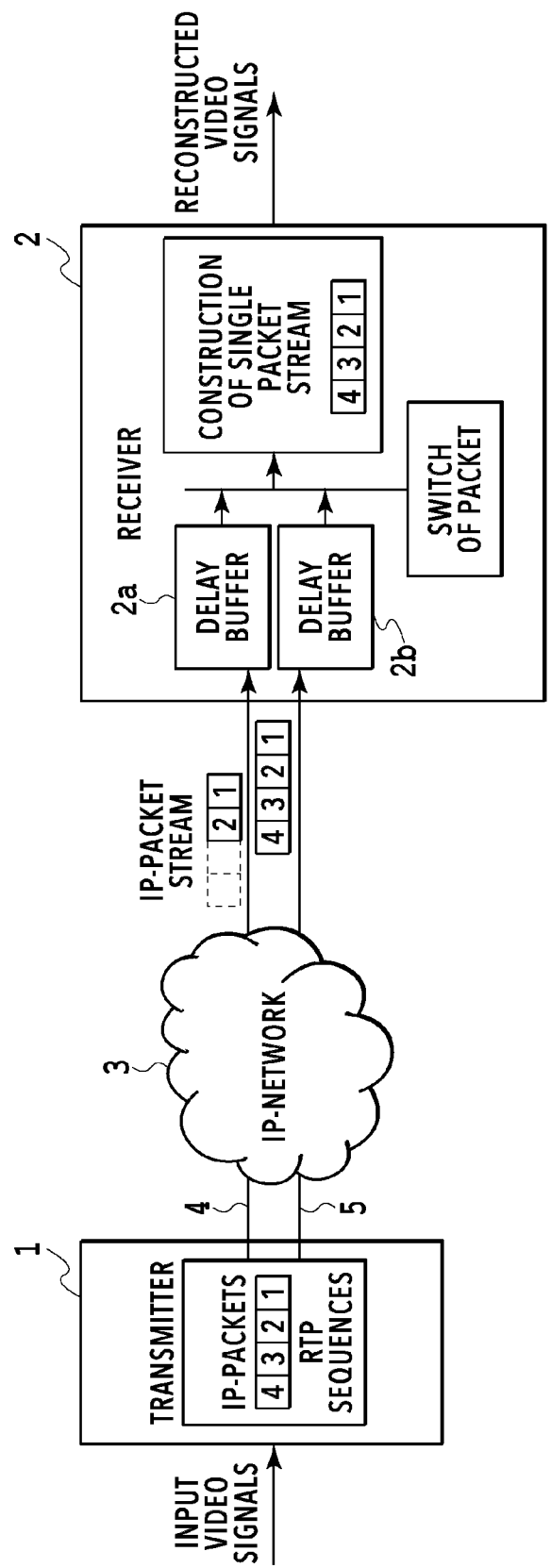
FIG. 1 shows a scheme for transmitting video signals according to SMPTE2022-7.
Figure 2:
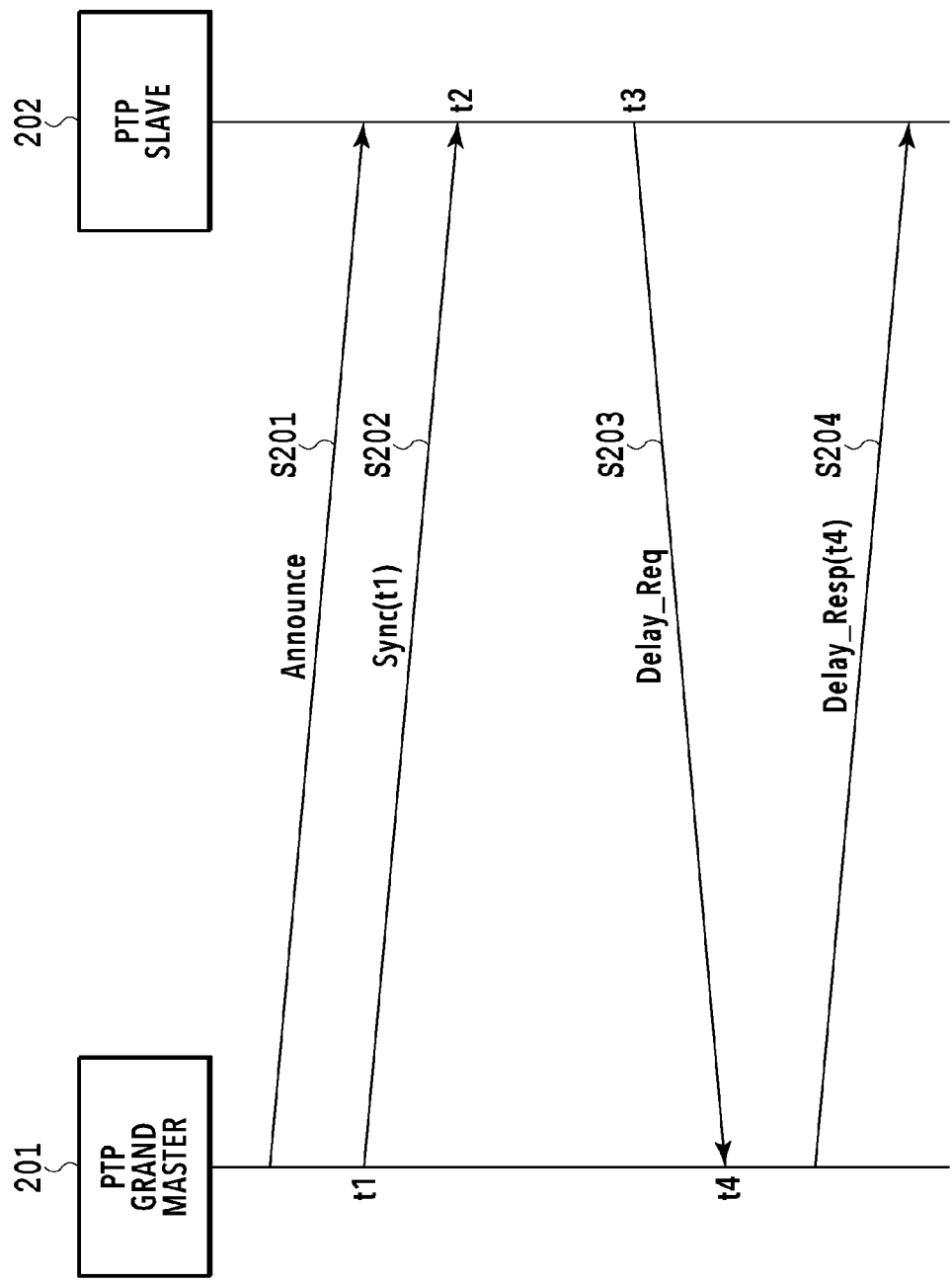
FIG. 2 shows operations based on PTP performed in a video transmission system according to a first embodiment.

As shown in FIG. 2, the PTP grand master 201 sends a Announce message to the PTP slave 202, and a relation between the PTP grand master 201 and the PTP slave 202 is established (step S201).

Next, the PTP grand master 201 sends a Sync message to the PTP slave 202 (step S202). The Sync message includes a time t1 at which it was sent. Once the PTP slave 202 receives the Sync message, a time t2 at which it was received is recorded.

The PTP slave 202 sends a Delay_Req message to the PTP slave 202 (step S203). The Delay_Req message includes a time t3 at which it was actually sent.

Next, the PTP grand master 201 sends a Delay_Resp message to the PTP slave 202 (step S204). The Delay_Resp message includes a time t4 at which it was actually received.

The PTP slave 202 calculates a round trip delay times and an offset (time difference) between the times in the PTP grand master 201 and the PTP slave 202. Provided that the one way delay time corresponds to one half of the round trip delay times, the offset for the PTP slave 202 would be calculated according to the following equation (1).

Offset=$(t2-t1)$-(one way delay time)

(One way delay time)=$\{(T2-T1)+(T4-T3)\}/2$ (1)

The PTP slave 202 maintains the time synchronization with the PTP grand master 201 by repeating the operations of PTP multiple times per second, smoothing the calculated offset values, and reflecting the offset values in the time information.

The embodiment describes the operations of PTP in the one step clock and the E2E (End-to-End) delay mechanism. Actually, PTP also specifies the two step clock and the P2P (Peer-to-Peer) delay mechanism. Further time correction operations are performed, and the time synchronization with higher accuracy is achieved. However, the disclosure does not provide further detailed description.

Figure 3:
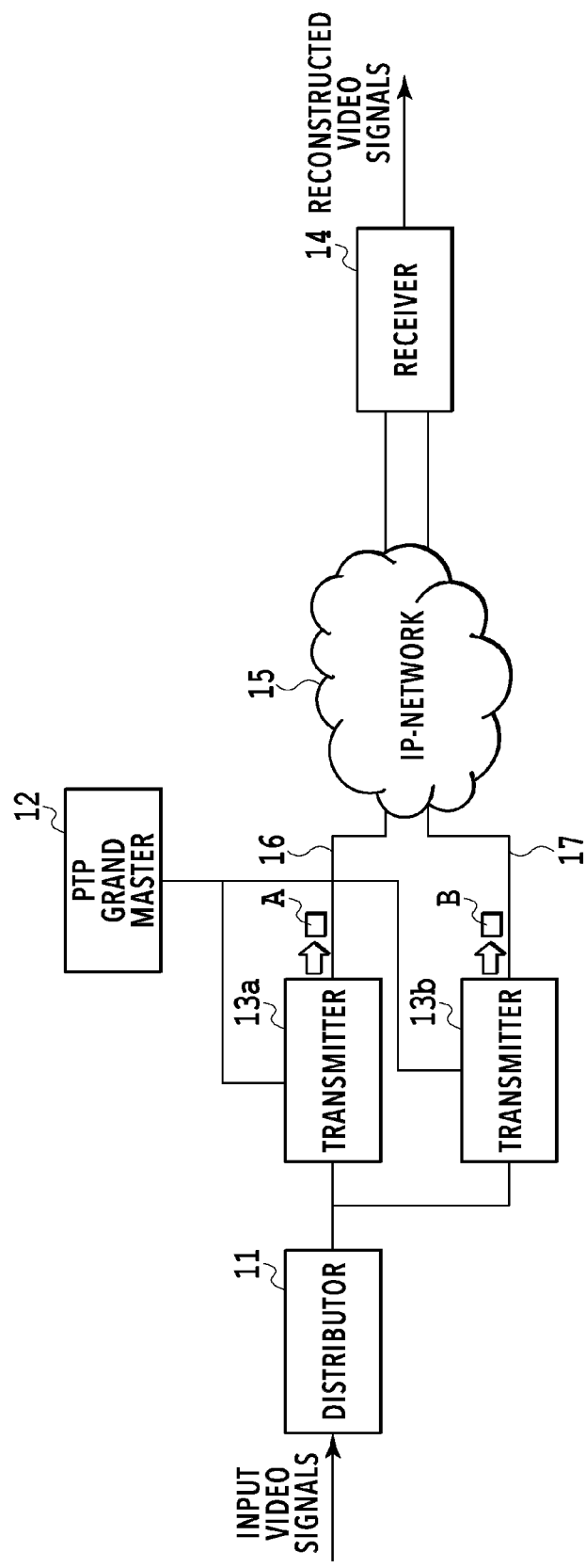
FIG. 3 shows a configuration of a video transmission system according to a first embodiment.

Then, referring to FIG. 3, a configuration of a video transmission system according to a first embodiment is described. It is assumed that the video transmission system according to the embodiments operates according to the protocol such as SMPTE2022-2 (specifying the transmission of MPEG-2 transport streams (TS) over IP-network) and SMPTE2022-6 (specifying the transmission of media signals with high bit rate over IP-network). Also, it is assumed that the IP-packets are transmitted over the IP-network according to RTP (Real-time Transport Protocol)/UDP (User Datagram Protocol).

As shown in FIG. 3, the video transmission system according to the first embodiment comprises a distributor 11, a PTP grand master 12, a transmitter 13a, a transmitter 13b, and a receiver 14. The transmitter 13a, the transmitter 13b, and the receiver 14 are connected over an IP-network 15. A transmission path 16 is between the transmitter 13a and the receiver 14, and a transmission path 17 is between the transmitter 13b and the receiver 14.

The distributor 11 receives input video signals transmitted from a broadcast station for example, and distributes the input video signals to the transmitters 13a and 13b. That is, the distributor 11 duplicates the input video signals. In the case that the video signals correspond to SDI signals or DVB-ASI signals, the distributor 11 corresponds a distributor including a connector with a coaxial cable or optical fiber cable. In the case that the video signals are transmitted via Ethernet, the distributor 11 corresponds to an Ethernet switch.

The PTP grand master 12 functions as the PTP grand master described in reference to FIG. 2. The PTP grand master 12 synchronizes the time with the transmitters 13a and 13b. Optionally, the grand master 12 may also synchronizes the time with the receiver 14.

Each of the transmitters 13a and 13b divides the input video signals distributed by the distributor 11 into IP-packets, and sends the IP-packets to the receiver 14 over the IP-network 15. The transmitter 13a sends to the receiver 14, the IP-packets A that are divided and IP-packetized from the input video signals via the transmission path 16 according to RTP. The transmitter 13b sends to the receiver 14, the IP-packets B that are divided and IP-packetized from the input video signals via the transmission path 17 according to RTP. That is, each of the transmitters 13a and 13b sends the IP-packets including the same payloads via a separate transmission path. Here, the same RTP sequence numbers are set to the IP-packets including the same payloads, and the details will be described hereinafter.

Each of the transmitters 13a and 13b functions as a PTP slave, and synchronizes the time with the PTP grand master 12 according to PTP. The time corresponds to the SMPTE Epoch, that is, numerical values representing the time since the time 00:00:00 UTC on 1 Jan. 1970. That is, the transmitters 13a and 13b have the elapsed time with the accuracy within a nanosecond level error at the particular time point since the epoch.

Although the embodiment employs the redundant system including two transmitters: the transmitter 13a and the transmitter 13b, the number of transmitters is not limited to two, and any number of transmitters are possible. Any number of transmission paths are possible according to the number of transmitters.

The PTP grand master 12 may be also implemented in the transmitter 13a, the transmitter 13b, or a third transmitter (not shown) other than the transmitters 13a and 13b. For example, if the PTP grand master 12 is implemented in the transmitter 13a, the transmitter 13b synchronizes the time with the transmitter 13a. If the PTP grand master 12 is implemented in the third transmitter, each of the transmitters 13a and 13b synchronizes the time with the third transmitter.

The receiver 14 receives both of the IP-packets A sent via the transmission path 16 and the IP-packets B sent via the transmission path 17. In the normal state, the receiver 14 reconstructs the video signals based on the IP-packets A (the IP-packets B are discarded).

On the other hand, if either of the transmitter 13a and the transmission path 16 (hereinafter referred to as "active system") fails, it is necessary for the receiver 14 switches from the IP-packets A to the IP-packets B to reconstruct the video signals based on the IP-packets B. In order to switch without corruption of the video signals to be outputted, the receiver 14 controls such that the timing of outputting the IP-packets including the same payloads is matched at the switching timing by buffering the IP-packets A and B in the delay buffers of the receiver 14. The receiver 14 determines whether the IP-packets B includes the same payloads as those of the IP-packets A by referring the RTP sequence numbers set in the IP-packets A and B (specified in SMPTE2022-7).

Figure 4:
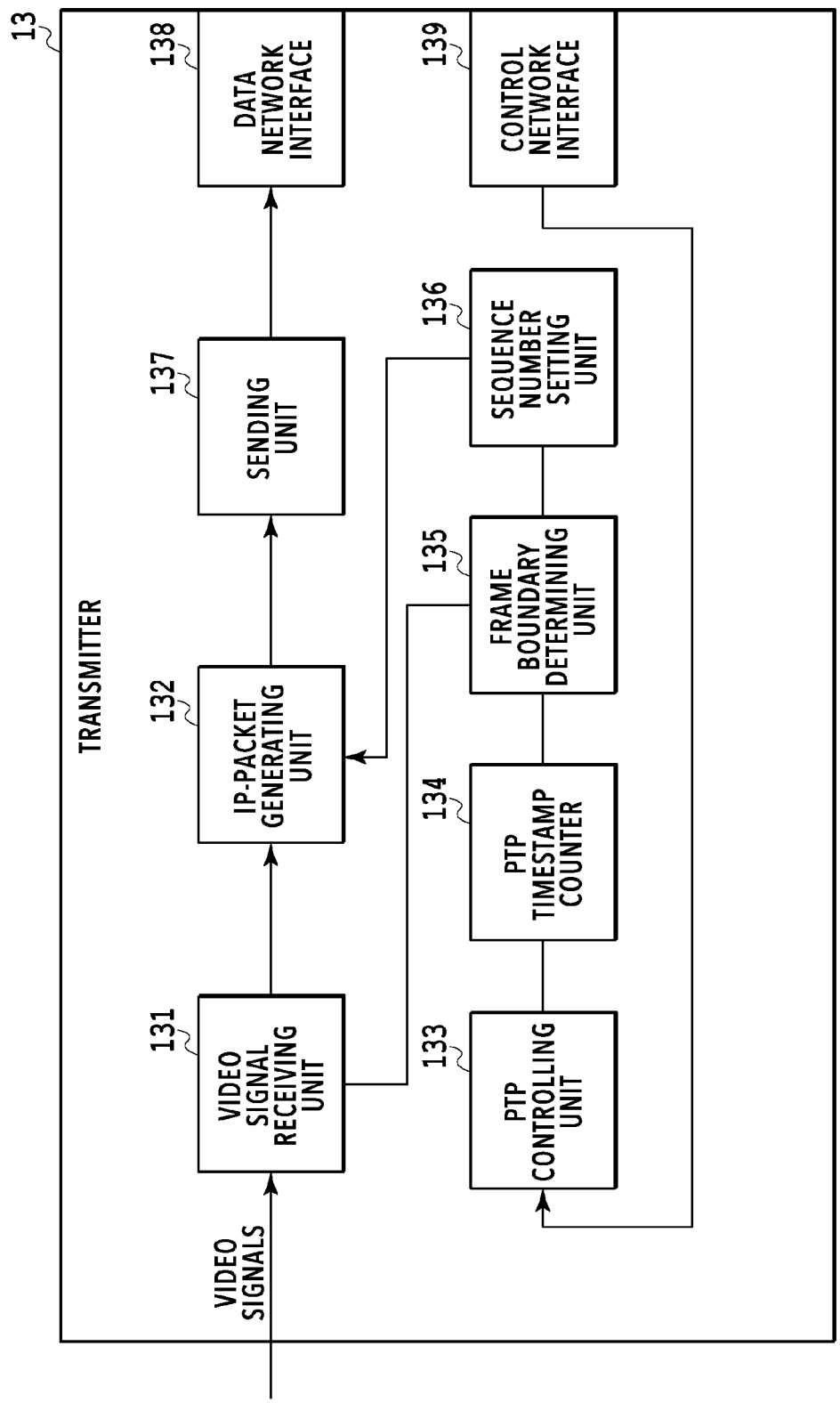
FIG. 4 shows a configuration of a transmitter according to a first embodiment.

Then, referring to FIG. 4, a configuration of the transmitters 13a and 13b (collectively referred to as "transmitter 13" in FIG. 4) described in reference to FIG. 3 is described. As shown in FIG. 4, the transmitter 13 comprises a video signal receiving unit 131, an IP-packet generating unit 132, a PTP controlling unit 133, a PTP timestamp counter 134, a frame boundary determining unit 135, a sequence number setting unit 136, a sending unit 137, a data network interface 138, and a control network interface 139.

The video signal receiving unit 131 receives the video signals distributed by the distributor 11. The IP-packet generating unit 132 generates the IP-packets from the received video signals according to RTP/UDP/IP for transmission over the IP-network 15. More specifically, the IP-packet generating unit 132 generates the IP-packets by adding the RTP headers, the UDP headers, the IP headers, and/or the MAC headers.

The PTP controlling unit 133 receives a PTP messages from the PTP grand master 12 via the control network interface 139, and synchronizes the time with the PTP grand master 12. The PTP timestamp counter 134 is incremented based on the time synchronization.

The frame boundary determining unit 135 determines the video frame boundaries in the video signals inputted to the video signal receiving unit 131. In the case that the video signals correspond to uncompressed video signals, the frame boundary determining unit 135 determines the video frame boundaries according to SMPTE424M, SMPTE292M, or SMPTE259M. In the case that the video signals are compatible to DVB-ASI, the frame boundary determining unit 135 determines the video frame boundaries by referring the payload unit start indicator in the TS header (when the video signals are compatible to SMPTE2022-s) in the IP-packets. In the case that the input interface for the video signals corresponds to Ethernet, the video signals are received in the IP-packets, and the format for the IP-packets is compatible to SMPTE2022-6, the frame boundary determining unit 135 determines the video frame boundaries by referring the M (marker) bit in the RTP header in the IP-packets. In the case that the input interface for the video signals corresponds to Ethernet, the video signals are received in the IP-packets, and the format for the IP-packets is compatible to SMPTE2022-2, the frame boundary determining unit 135 determines the video frame boundaries by referring the payload unit start indicator in the TS header. The above determination of the video frame boundary are based on the existing standard, and are implemented in many video equipment, and thus, the disclosure does not provide further detailed description.

The sequence number setting unit 136 calculates the RTP sequence numbers based on the timestamps according to the increment of the PTP timestamp counter 134. The calculated number is set to the RTP sequence number field (specified in RTP) in the RTP header of the first IP-packet in the video frame as a reference of the video frame boundary determined by the frame boundary determining unit 135. Here, a method of setting the RTP sequence numbers is described in reference to FIG. 5.

Figure 5:
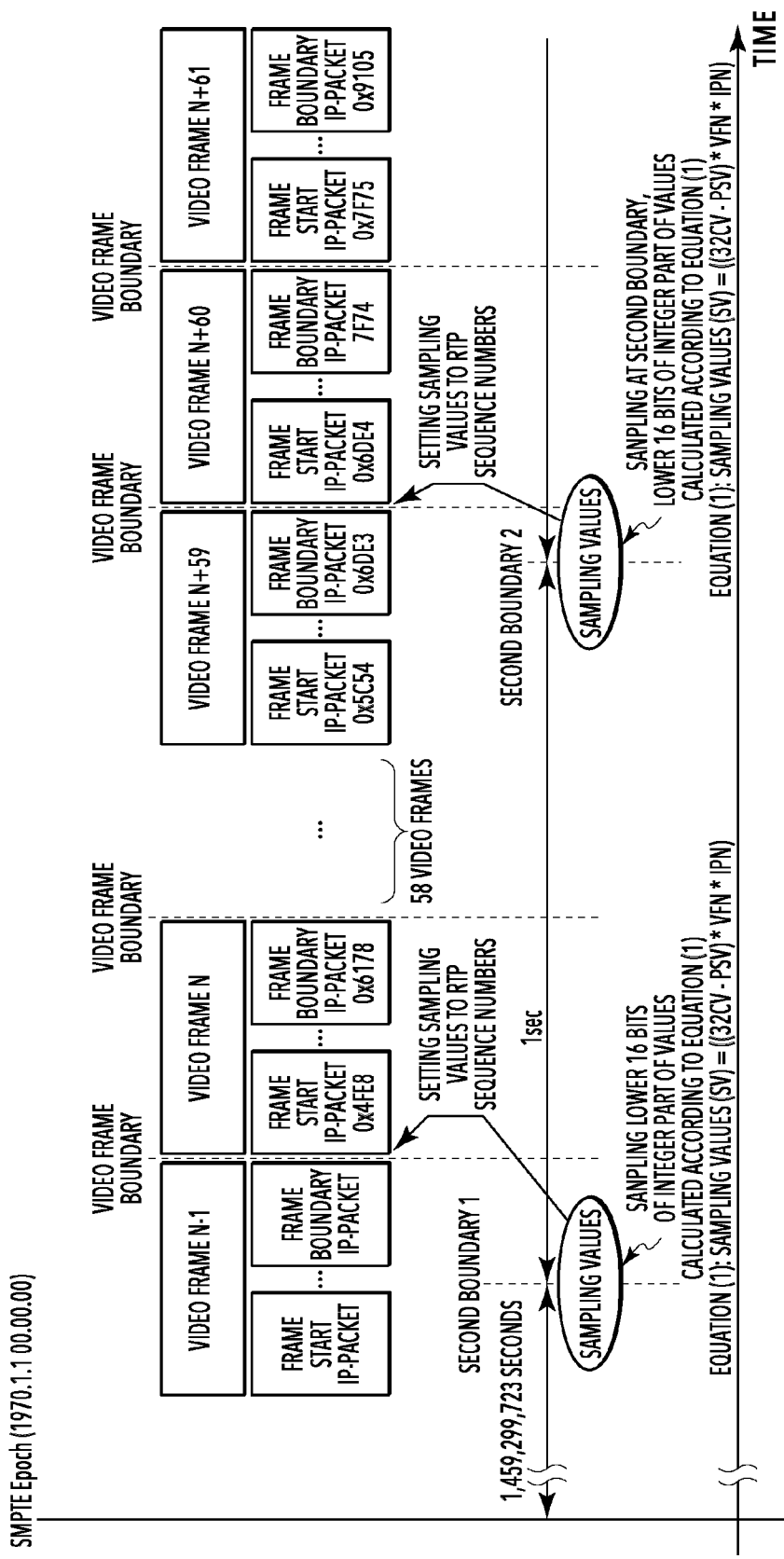
FIG. 5 shows a method of setting of RTP sequence numbers according to a first embodiment.

FIG. 5 shows a relation between the video frame boundaries of the IP-packets to be sent and the time. In FIG. 5, the horizontal axis corresponds to the time axis. As shown in FIG. 5, one video frame includes a predetermined numbers of IP-packets.

Firstly, the sequence number setting unit 136 refers the timestamps according to the increment of the PTP timestamp counter 134, and samples, when one seconds elapses, that is, the time is updated in seconds (at a second boundary ("second boundary 1" is shown in FIG. 5)), the lower 16 bits of integer part of values calculated according to the equation (1)

$$\text{Sampling values } (SV) = ((32CV - PSV) * VFN * IPN) \qquad (2)$$

32 CVs are the 32 bits count values with seconds or more of the updated PTP timestamp counter 134, PSVs are the values with seconds or more of the preset time, VFN is the number of video frames per second, and IPN is the number of IP-packets per video frame. The preset time is common values between the transmitters 13$a$ and 13$b$, and is the time since the SMPTE Epoch specified in SMPTE2059-1 in the embodiment in reference to FIG. 5. When using the total numbers of video frames since the SMPTE Epoch in calculating the RTP sequence numbers as is, the preset time is zero. It is noted that the above calculation may be easily implemented in a normal embedded processor or a logical circuit.

Then, the sequence number setting unit 136 sets as initial values the calculated RTP sequence numbers in IP-packets at which the video frame starts (video frame start IP-packet) as a reference of the video frame boundary (video frame boundary IP-packet) determined by the frame boundary determining unit 135. Here, the video frame boundary IP-packet means the last IP-packet per video frame.

In explaining the example in reference to FIG. 5, the second boundary is reached while the predetermined numbers of IP-packets in video frame N−1 are generated. It is assumed that the values of the PTP timestamp counter 134 are ahead of the SMPTE Epoch by 16,890 days (46 years and one hundred days), one hour, two minutes, and three seconds at this time point. In this case, 32CV is 1,459,299, 723 seconds. Provided that the format in which the video signals are sent is 1080P, the size per video frame is 6,187,500 bytes. When using the IP-packets with payload length of 1376 bytes specified in SMPTE2022-6, IPN is 4497. Provided that the frequencies in video frame is 59.94 Hz, VFN is (60 Hz*1000/1001). Provided that PSV is zero, the integer values on which the sampling values at the second boundary shown in FIG. 5 are calculated based are calculated according to the equation (2)

$$1{,}459{,}299{,}723 * (60 * 1000/1001) * 4497 \qquad (3)$$

The following values can be obtained by rounding down the calculated values according to the equation (3) 393,354,896,363,496 (0x165C112DE4FE8 in hexadecimal number).
The lower 16 bits of the calculated sampling values are 0x4FE8.
Once the boundary between the video frames N and N−1 is determined, the initial values "0x4FE8" are set to the RTP sequence number of the frame start IP-packet in the video frame N. The RTP sequence numbers added sequentially one are set to the IP-packets to be sent subsequently until the next "second boundary" ("second boundary 2" is shown in FIG. 5).

Each of the transmitters 13$a$ and 13$b$ synchronizes the time with the accuracy within a nanosecond level error according to PTP. Therefore, the difference between the video signals distributed by the distributor 11 to the transmitters 13$a$ and 13$b$ is only the sum of delay times in the length of cables in which the video signals are delivered and the delay times in distributor 11. If the difference between the timings of "second boundary" and video frame boundary is greater than the above difference between the delay times, for the IP-packets A and B including the same payloads sent via the transmission paths 16 and 17, the calculated values according to the equation (1) are equal, and the IP-packets A and B include the same RTP sequence numbers.

On the other hand, if the difference between the timings of "second boundary" and the video frame boundary is smaller than the above difference between the delay times, that is, the difference between the timings of "second boundary" and the video frame boundary is slight, for the IP-packets A and B including the same payloads sent via the transmission paths 16 and 17, the calculated values according to the equation (1) may not be equal. In this case, the sampling values are not set to the RTP sequence numbers at the timing of "next second boundary" ("second boundary 2" as a reference of "second boundary 1" in FIG. 5), and it may be repeated to add one to the RTP sequence numbers sequentially. Alternatively, by delaying the timing of calculating the sampling values from the timing of "second boundary" to a predetermined degree, for the IP-packets A and B including the same payloads sent via the transmission paths 16 and 17, the calculated values according to the equation (1) are equal, and the IP-packets A and B can include the same RTP sequence numbers.

According to this configuration, the RTP sequence numbers are calculated at the timing of "second boundary", and the calculated RTP sequence numbers are set at the start of video frame. After that, the RTP sequence numbers added sequentially one are set to the IP-packet to be sent subsequently until the next second boundary. According to this configuration, each of the transmitters 13$a$ and 13$b$ can set the same RTP sequence numbers to the IP-packets including the same payloads without matching the RTP sequence numbers each other.

Although calculating the sampling values and setting the RTP sequence numbers are performed at every second, that is, at the "second boundary", it is merely illustrative and calculating and setting may be performed at any time interval such as 0.5 seconds or two seconds. It may also be possible to calculate the sampling values and set the RTP sequence numbers in response to the manual instruction via the GUI or command line input from the control network interfaces 139 of the transmitters 13$a$ and 13$b$, or to the software program instruction, alternative to calculate the sampling values and set the RTP sequence numbers periodically at any time interval.

The sending unit 137 sends packet-by-packet the IP-packet stream generated by the IP-packet generating unit 132 via the data network interface 138 over the IP-network 15.

As such, each of the transmitters 13$a$ and 13$b$ can set the RTP sequence numbers to the IP-packets including the same payloads and send the IP-packets to the receiver 14 without matching the RTP sequence numbers each other.

The receiver 14, when detecting that the active system fails, switches from the IP-packets A sent via the transmission path 16 to the IP-packets B sent via the transmission path 17. At the switching timing, the receiver 14 determines the IP-packets including the same payloads from the IP-packets A and B based on the RTP sequence numbers, and matches the timings of outputting the IP-packets including the same payloads by buffering the IP-packets according to SMPTE2077-7, thereby avoiding that the instantaneous interruption occurs in reconstructing the video signals (No instantaneous interruption (hit) is generally referred to as seamless or hitless). It is noted that the operations for the receiver to reconstruct the video signals based on the IP-packets are specified in SMPTE2022-7, and can be easily implemented in existing technique, and thus the disclosure does not provide further detailed description.

The first embodiment provides the example of switching to the backup system when the transmission path of the active system fails, and embodiment is not limited to such example. For example, the first embodiment may be applied to the case that the active system does not fail (e.g. transmission paths are not switched), and a portion of IP-packets A is lost. In this case, it can identify the IP-packets B including the same payloads as those in the IP-packets A from the IP-packets B sent via the transmission path 17. The identified IP-packets B are used as alternative to the lost IP-packets A. Since it can identify the IP-packets including the same payloads as those in the lost IP-packets, it is possible to reconstruct the video signals seamlessly from the IP-packets by buffering the IP-packets and delaying the predetermined time (hereinafter, the same is applicable to the second embodiment).

Second Embodiment

Figure 6:
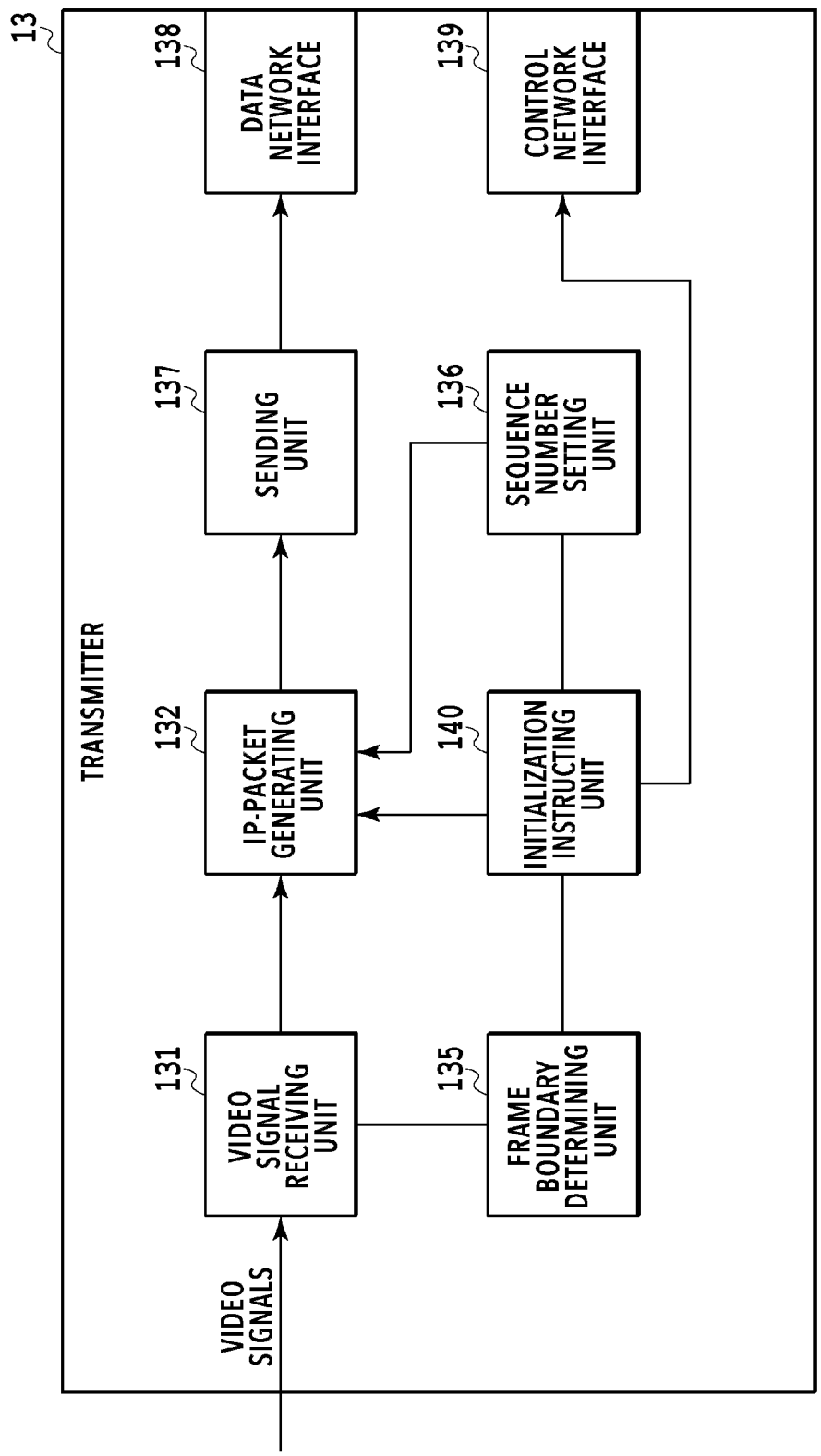
FIG. 6 shows a configuration of a transmitter according to a second embodiment.

Then, referring to FIG. 6, the second embodiment is described. FIG. 6 shows a configuration of a transmitter according to the second embodiment. In the second embodiment, the transmitter 13a issues an initialization instruction to the transmitter 13b at a predetermined timing, and the transmitter 13b initializes the RTP sequence numbers at the same timing as the transmitter 13a in response to the initialization instruction.

The video transmission system according to the second embodiment is the same as that in the first embodiment except for the configuration of the transmitter. As shown in FIG. 6, the transmitter according to the second embodiment comprises an initialization instructing unit 140 instead of the PTP controlling unit 133 and the PTP timestamp counter 134.

Figure 7:
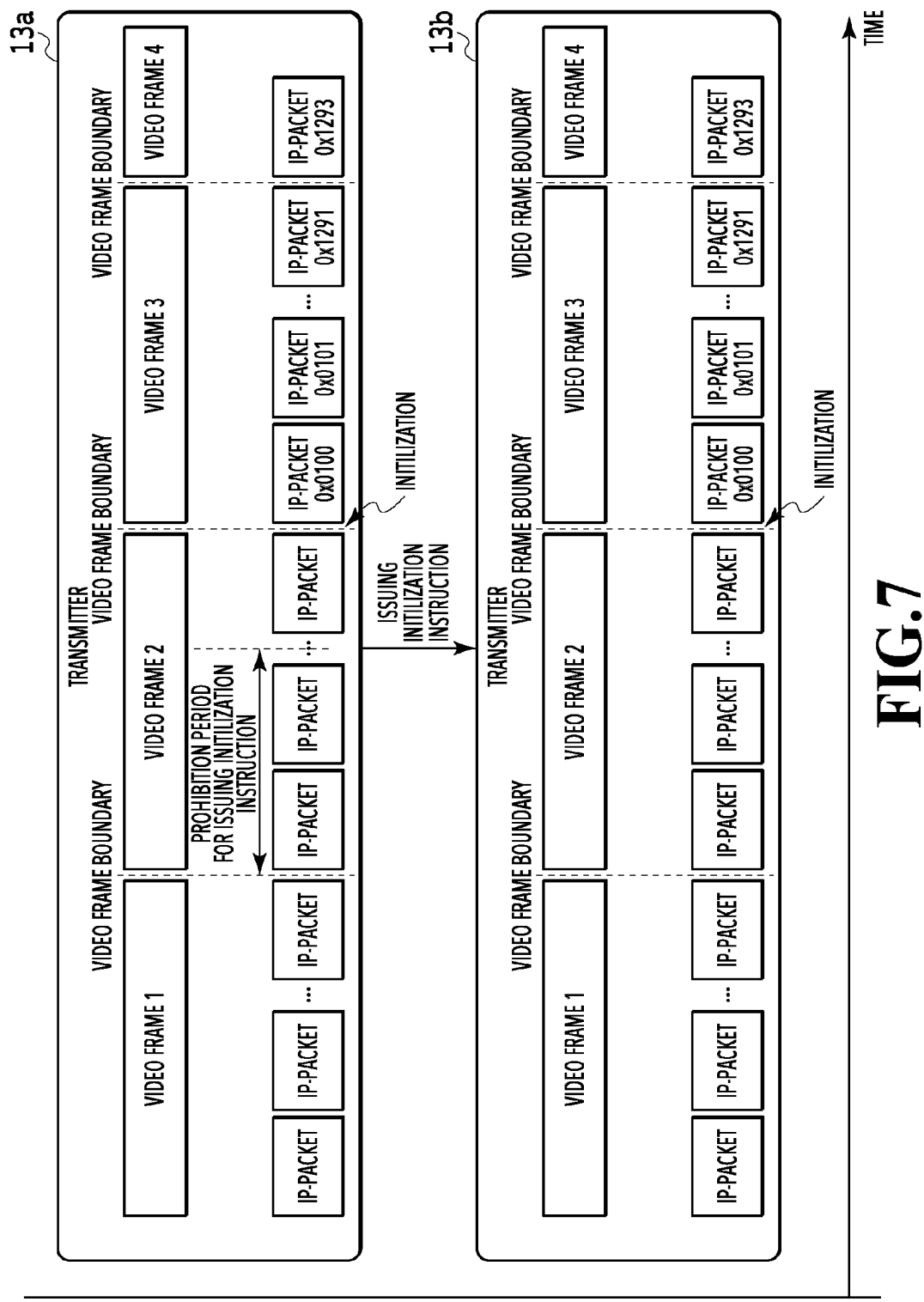
FIG. 7 shows a method of setting of RTP sequence numbers according to a second embodiment.

The initialization instructing unit 140, once the frame boundary determining unit 135 determines the video frame boundary, issues the initialization instruction to another transmitter (e.g. the transmitter 13a issues to the transmitter 13b) in wait for a predetermined time. The initialization instruction may be issued in the dedicated UDP packet or the MAC frame for example. Alternatively, the initialization instruction may be issued in predetermined messages in the TCP/IP session established between the transmitters 13a and 13b. It is apparent that it can easily implement to issue the initialization instruction using other existing technique. Referring to FIG. 7, a method of setting of the RTP sequence numbers is described.

FIG. 7 shows a relation between the video frame boundaries of the IP-packets to be sent and the time. An upper part in FIG. 7 shows operations performed by the transmitter 13a. A lower part in FIG. 7 shows operations performed by the transmitter 13b.

When is necessary to match the RTP sequence numbers between the transmitters 13a and 13b, in the transmitter 13a, once the frame boundary determining unit 135 determines the video frame boundary (boundary between the video frames 1 and 2), the initialization instructing unit 140 issues the initialization instruction to the transmitter 13b in wait for the predetermined time (prohibition period for issuing initialization instruction).

In the transmitter 13a, after the prohibition period for issuing initialization instruction elapses (or after the initialization instruction is issued), when the frame boundary determining unit 135 determines the subsequent video frame boundary, the initialization instructing unit 140 initializes the RTP sequence numbers with predetermined numbers. On the other hand, in the transmitter 13b, once the transmitter 13a receives the initialization instruction, when the frame boundary determining unit 135 determines the subsequent video frame boundary, the initialization instructing unit 140 initializes the RTP sequence numbers with predetermined numbers. Here, the predetermined numbers used by the transmitters 13a and 13b for initialization are the same numbers.

In the embodiment, the initialization instructing unit 140 of the transmitter 13a waits for the predetermined time (prohibition period for issuing initialization instruction). This is because that if the initialization instruction is issued to the transmitter 13b immediately after determining the video frame boundary, transmitter 13b may incorrectly determine the video frame boundary for which the RTP sequence number is initialized due to the difference between the delay times in inputting the video signals to the transmitter 13a and 13b. As shown in FIG. 7, for example if in the transmitter 13b, the timing of determining the boundary between the video frames 1 and 2 is later than the timing of receiving the initialization instruction, the RTP sequence number is initialized for the first IP-packet in the video frame 2, not for the first IP-packet in the video frame 3, which leads to the mismatch of the IP-packets between the transmitters 13a and 13b. The mismatch can be avoided by making the prohibition period for issuing initialization instruction by the transmitter 13a be greater than the difference between the delay times in inputting the video signals to the transmitters 13a and 13b.

As such, the transmitters 13a and 13b can initialize the RTP sequence numbers at the same timing after immediately determining the same subsequent video frame boundaries. After that, the RTP sequence numbers added sequentially one are set to the IP-packets to be sent subsequently. Therefore, each of the transmitters 13a and 13b can set the same sequence numbers to the IP-packets including the same payloads.

In the second embodiment, it can match the RTP sequence numbers between the transmitters 13a and 13b without being compatible to PTP by the transmitter 13a issuing the initialization instruction to the transmitter 13b at a certain interval, thereby implementing the transmitters 13a and 13b with the configurations easier than those in the first embodiment.

In the embodiment, although the prohibition period for issuing initialization instruction refers to the predetermined period until the subsequent video frame boundary since the video frame boundary is determined, the prohibition period is not limited to the above example. For example, the initialization instruction may waited to be issued until the predetermined numbers of IP-packets are sent since the video frame boundary is determined.

The video transmission system according to the embodiments is described above. It is noted that the operations performed by the components described above, and the order of the operations are merely illustrative.

DESCRIPTION OF REFERENCE NUMBERS

A IP-packet
B IP-packet
16 transmission path
17 transmission path

The invention claimed is:

1. A video transmission system comprising:
a Precision Time Protocol (PTP) grand master;
a first transmitter configured to, independently from the synchronized by the first transmitter, synchronize a time with the PTP grand master according to PTP;
a second transmitter configured to synchronize a time with the PTP grand master according to PTP; and
a receiver connected to the first transmitter and the second transmitter over an IP-network,
wherein the first transmitter and the second transmitter respectively:
receive video signals distributed from one video signal;
divide the video signals into a plurality of IP-packets;
calculate an initial value for Real-time Transport Protocol (RTP) sequence numbers based on PTP timestamps in accordance with the synchronized time according to PTP; and
set the RTP sequence numbers sequential from the initial value to a RTP sequence fields in the plurality of IP-packets respectively,
the first transmitter sends to the receiver, the plurality of IP-packets set the RTP sequence numbers as first IP-packets via a first transmission path according to RTP, and
the second transmitter sends to the receiver, the plurality of IP-packets set the RTP sequence numbers as second IP-packets via a second transmission path according to RTP.

2. The video transmission system comprising according to claim 1, wherein the first transmitter and the second transmitter respectively:
obtain the PTP timestamps at a predetermined period of time; and
calculate the initial value for RTP sequence numbers from the obtained PTP timestamps.

3. The video transmission system comprising according to claim 1, wherein the first transmitter and the second transmitter respectively:
detect a video frame boundaries from the received video signals; and
set the calculated initial value to the RTP sequence fields in the IP-packets at a predetermined position based on the detected video frame boundaries.

4. A video transmission system comprising:
a first transmitter configured to receive video signals distributed from one video signal, divide the video signals into a plurality of first IP-packets, and send the plurality of first IP-packets via a first transmission path;
a second transmitter configured to receive the distributed video signals, divide the video signals into a plurality of second IP-packets, and send the plurality of second IP-packets via a second transmission path; and
a receiver connected to the first transmitter and the second transmitter over an IP-network,
wherein the first transmitter:
sets sequence numbers as first Real-time Transport Protocol (RTP) sequence numbers to RTP sequence fields in the plurality of first IP-packets respectively;
sends to the receiver, the plurality of first IP-packets set the first RTP sequence numbers via the first transmission path according to RTP; and
issues an initialization instruction to the second transmitter at a predetermined timing,
wherein the second transmitter:
sets sequence numbers as second RTP sequence numbers to RTP sequence fields in the plurality of second IP-packets respectively;
sends to the receiver, the plurality of second IP-packets set the second RTP sequence numbers via the second transmission path according to RTP;
receives the issued initialization instruction; and
in response to receiving the initialization instruction, initializes the second RTP sequence numbers.

5. The video transmission system comprising according to claim 4, wherein the first transmitter determines a first video frame boundary from the inputted video signals, and issues the initialization instruction after a predetermined time elapses since the determined first video frame boundary.

6. The video transmission system comprising according to claim 5, wherein the first transmitter determines from the inputted video signals, a Nth video frame boundary from the determined first video frame boundary, and initializes the first RTP sequence numbers based on the determined Nth video frame boundary,
wherein the second transmitter determines a second video frame boundary from the inputted video signals in response to receiving the initialization instruction, and initializes the second RTP sequence numbers based on the determined second video frame boundary.

* * * * *

UNITED STATES PATENT AND TRADEMARK OFFICE
CERTIFICATE OF CORRECTION

| | | |
|---|---|---|
| PATENT NO. | : 11,190,819 B2 | Page 1 of 1 |
| APPLICATION NO. | : 16/645909 | |
| DATED | : November 30, 2021 | |
| INVENTOR(S) | : Kazunori Nakamura et al. | |

It is certified that error appears in the above-identified patent and that said Letters Patent is hereby corrected as shown below:

In the Specification

Column 1, Line 3, delete "RELATE" and insert -- RELATED --

In the Claims

Column 11, Line 16, Claim 1, delete "synchronized" and insert -- synchronization --

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*